United States Patent [19]
Gstöhl et al.

[11] 3,835,284
[45] Sept. 10, 1974

[54] MEANS FOR SURFACE TREATING AND WELDING TO A METAL

[75] Inventors: Norbert Gstöhl, Eschen; Dankmar Tauern, Triesenberg, both of Liechtenstein

[73] Assignee: Hilti Aktiengesellschaft, Schaan, Liechtenstein

[22] Filed: June 23, 1972

[21] Appl. No.: 265,518

Related U.S. Application Data
[62] Division of Ser. No. 132,040, April 7, 1971, Pat. No. 3,701,879.

[30] Foreign Application Priority Data
Apr. 13, 1970 Germany.............................. 2017655

[52] U.S. Cl.................................... 219/98, 219/99
[51] Int. Cl......................... B23k 9/00, B23k 11/04
[58] Field of Search...................... 219/69 E, 98, 99

[56] References Cited
UNITED STATES PATENTS

| | | | |
|---|---|---|---|
| 2,718,579 | 9/1955 | Kennedy................................. | 219/98 |
| 3,092,714 | 6/1963 | Hinden............................. | 219/98 X |
| 3,125,665 | 3/1964 | Snider............................. | 219/69 E |
| 3,414,700 | 12/1968 | Glorioso............................ | 219/98 |

FOREIGN PATENTS OR APPLICATIONS
795,481  5/1958  Great Britain...................... 219/98

*Primary Examiner*—J. V. Truhe
*Assistant Examiner*—Hugh D. Jaeger
*Attorney, Agent, or Firm*—Toren and McGeady

[57] ABSTRACT

The surface of a metal workpiece, to which a capacitor discharge stud welding gun is to weld a stud, is precleaned by discharging the gun while it holds a tungsten or other high-melting-point electrode against the workpiece. This passes a stud-welding current pulse through the electrode and the workpiece. It causes a short explosive heating effect that tears up the surface of the workpiece and rips away the thus loosened contamination. It produces a clean metal surface whose extent corresponds to the diameter of the electrode. The magnitude and duration of the pulse are such as to have welded a stud with a lower melting point to the metal. The tungsten electrode may be replaced with titanium, niobium, zirconium, molybdenum etc. These have lower melting points and produce slight surface diffusion of these materials into the metal to form desirable alloys.

14 Claims, 6 Drawing Figures

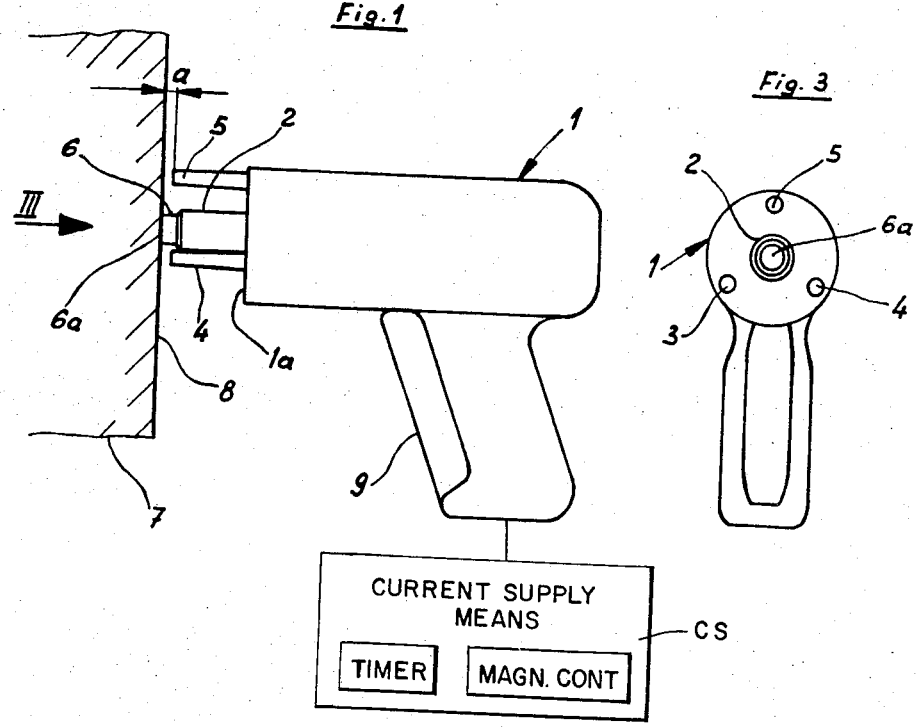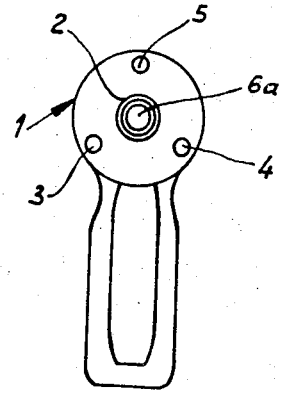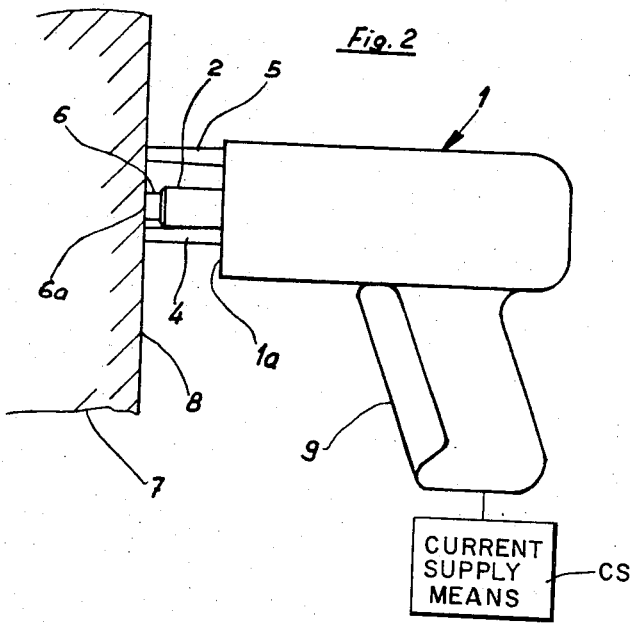

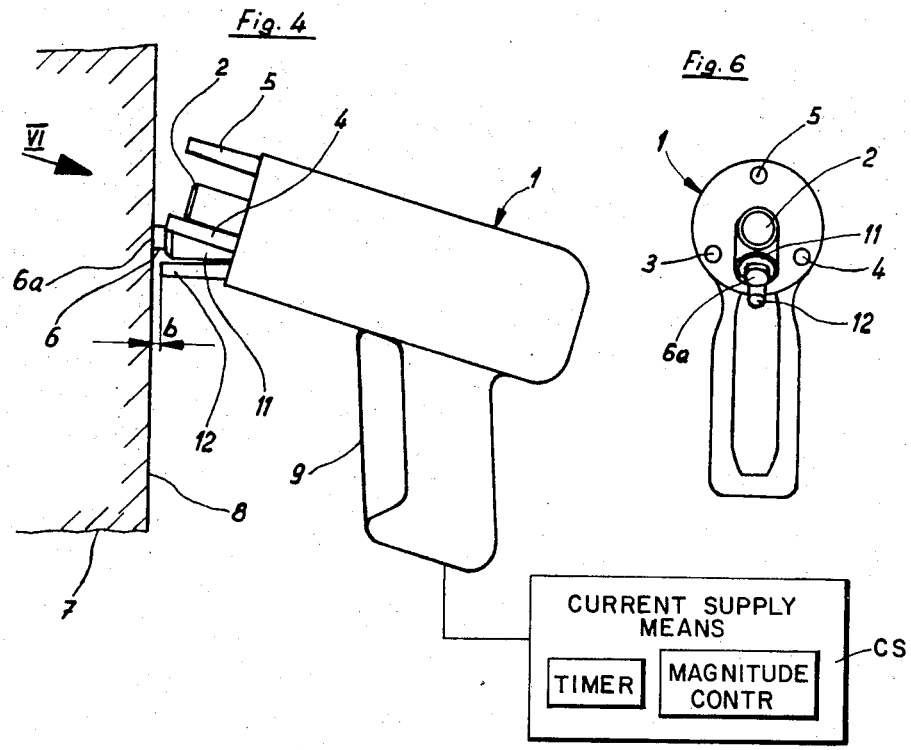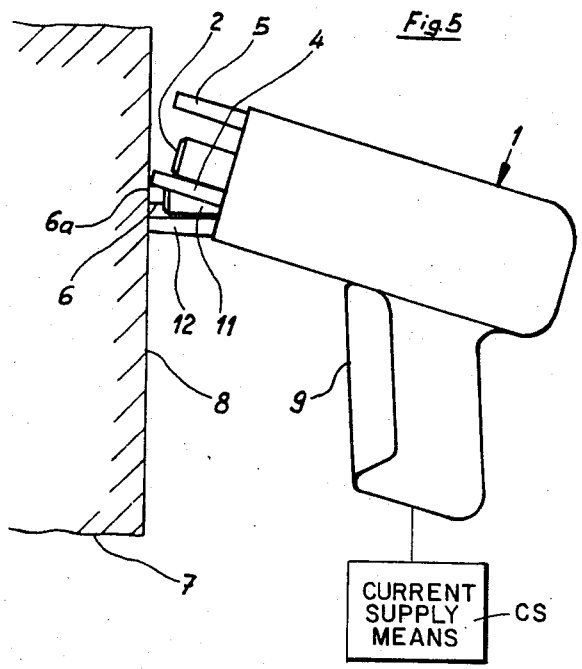

MEANS FOR SURFACE TREATING AND WELDING TO A METAL

This is a division of application Ser. No. 132,040 filed Apr. 7, 1971, now U.S. Pat. No. 3,701,879.

BACKGROUND OF THE INVENTION

This invention relates to methods and means for treating the surfaces of metals, and particularly, although not exclusively, to electrical burn-off processes and apparatuses for precleaning metal surfaces so that attachment elements can be stud welded thereto with a capacitor discharge stud welding gun.

Capacitor discharge stud welding of elements such as bolts or studs to the surface of a metal workpiece involves pressing the element against the surface of the metal workpiece and passing a current pulse through the element and the workpiece. In order to achieve a strong, substantially flawless, weld it is important that the workpiece surface be clean before and during the welding operation. It is especially important that the surface to which the element is to be welded be free of surface contamination such as rust, scale, paint, grease, oil, etc. Hitherto contamination free surfaces were achieved by cumbersome methods such as sand blasting, sandpapering, wire brush cleaning, chemical cleaning, and the like. Such cleaning methods usually were not sufficiently effective to provide for the flawless type of results which were desired.

Other methods of surface cleaning employ an arc. For example, one capacitor discharge welding method employs an ignition arc or pilot arc for cleaning the surface as well as performing its usual arc starting function. However, an ingnition arc acts on only a small area of the workpiece. It is thus very difficult to clean surface areas sufficiently large for welding elements such as studs of large diameter. Moreover, the equipment and energy necessary to produce and support an arc which serves not only as an ignition control but also for cleaning, is rather substantial. It results in a largely cumbersome arrangement. The problem with such an arrangement is aggravated noticeably when the ignition arc is supported by the discharge of a storage-battery-charged capacitor which is also supposed to furnish the welding energy during the same discharge without recharging. The available charge energy must then be treated with great economy. Thus, cleaning is made more difficult if not impossible because of the energy consumption which must be balanced in this prior art method between cleaning, ignition and welding.

An object of the invention is to avoid the beforementioned disadvantages.

Another object of the invention is to improve metal surface treatment methods and means.

Still another object of the invention is to clean an area as large as the element, such as the stud, to be welded with the least equipment, energy, and in the shortest period of time.

Still another object of the invention is to adapt existing equipment for such cleaning operations.

SUMMARY OF THE INVENTION

According to a feature of the invention these objects are obtained and the problems obviated by applying the current pulse, which would normally be applied through an element and the workpiece during welding of the element to the workpiece, through an electrode having a melting point higher than the melting point of the material of the element, while pressing this electrode against the metal workpiece.

According to another feature of the invention the electrode includes metal such as tungsten, titanium, niobium, zirconium, molybdenum, etc.

According to yet another feature of the invention the current pulse or burst is effected by means of an explosionlike discharge, of the welding capacitor in a condenser discharge stud welding machine, applied through the workpiece and the electrode pressed firmly against the workpiece. For convenience the electrode may be referred to as a burn-off electrode because of its ability to burn off contaminants.

The short pulse produced by the rapid discharge of the capacitor through the low resistance of the burn-off electrode and the workpiece tears up or shatters the contaminated surface layer of the metal workpiece in a manner similar to the effect of a "wire explosion", so that the contaminants are loosened and scattered. This creates a clean workpiece surface whose extent corresponds to the diameter of the burn-off electrode pressed against the metal workpiece surface. This makes it possible to adapt the size of the cleaned area to the element to be welded by choosing a burn-off electrode of proper cross section. Since only the uppermost surface layer of the workpiece is heated during the discharge process thin metal sheets may be cleaned in this matter.

According to another feature of the invention the support of a welder, suitable for capacitor discharge welding of elements such as bolts or studs, holds the burn-off electrode. The burn-off electrode may then be removed from the support after the apparatus has been used to clean the welding sites. The support then receives the welding element for subsequent welding operations. Such an apparatus is suitable for mass produced welding of such elements to workpieces. The elements may be used as fasteners and the like. In general studs are applied as fastening elements.

According to another feature of the invention the support means form a part of a stud welding gun.

According to another feature of the invention the support means include first holding means for the welding element and a second holding means for the burn-off electrode. Connecting means connect the capacitor which is being discharged to each of these holding means. The two holding means are particularly suited for fastening individual elements because the burn-off electrode need not be removed from its own holding means for performing the welding operation.

According to still another feature of the invention the holding means for the burn-off electrode is inclined relative to the holding means for the welding element. Thus, the welding gun need merely be tipped for performing the burn-off operation so as to bring the burn-off electrode into its operating position.

According to still another feature of the invention, three legs are aligned parallel to the direction in which the first holding means holds the element such as the stud to be welded. These legs align the element perpendicular to the surface of the workpiece. A fourth leg, parallel to the direction in which the second holding means directs the burn-off electrode, forms a tripod with two of the other legs to position the burn-off electrode perpendicular to the workpiece.

According to another feature of the invention, spring means in the support means biases the burn-off electrode against the workpiece while the fourth leg and the two other legs rest against the workpiece.

According to yet another feature of the invention, the burn-off electrode is composed of a metal highly resistant to combustion, such as a hard metal like tungsten. This enables a large number of cleaning operations to be carried out with the same electrode without the electrode experiencing wear due to the combustion. This is particularly advantageous where large production batches are involved.

According to still another feature of the invention, the burn-off electrode is composed of a material which is comparatively hard to melt such as titanium, niobium, zirconium, molybdenum, etc. Aside from performing the cleaning operation such electrodes induce an alloying phenomenon in the uppermost layer of the workpiece. This alloying has a beneficial effect on the welded connection.

These and other features of the invention are pointed out in the claims. Other objects and advantages of the invention will become obvious from the following detailed description when read in light of the accompanying drawings.

BRIEF DESCRIPTION OF THE DRAWINGS

FIG. 1 is a partly schematic elevation of a welding gun which embodies features of the invention, and which is shown adjacent to a workpiece prior to performing a cleaning operation;

FIG. 2 is a partially schematic illustration of the gun in FIG. 1 in position for its burn-off operation;

FIG. 3 is a frontal view of the gun in FIGS. 1 and 2 shown from the direction III in FIG. 1;

FIG. 4 is a partly schematic elevation of another gun embodying features of the invention in its pre-burn-off operation position;

FIG. 5 is a partly schematic elevational view of the gun in FIG. 4 in position for its burn-off operation; and FIG. 6 is an end view of the gun in FIG. 4 from the direction IV.

DETAILED DESCRIPTION OF PREFERRED EMBODIMENTS

In FIGS. 1, 2, and 3 a welding gun generally designated 1 has projecting from its front face 1a, a welding element holder 2 and three tripod forming legs 3, 4 and 5. A burn-off electrode 6 is inserted into the welding element holder 2 so as to be secure therein. Within the gun 1 a suitable spring biases the welding element holder and the burn-off electrode inserted therein axially against an interior stop so that the front face 6a of the burn-off electrode 6 extends beyond a plane defined by the ends of the legs 3, 4 and 5 by a distance $a$ corresponding to from 1 to 5 mm.

The welding gun 1 is brought into operating position as shown in FIGS. 1 to 3 by pushing it against a workpiece 7 so that the axis of electrode 6 is perpendicular to the surface 8 which is to support the element that is to be welded thereon. When the gun is pushed perpendicularly against the workpiece surface 8 and against the biasing action of the internal spring on the welding element holder, the latter and the burn-off electrode 6 recede longitudinally into the gun 1 until the tripod legs 3, 4 and 5 rest on the workpiece surface 8 so as to form a three point contact. A trigger 9 then may be depressed to initiate the discharge process. A current supply means CS with a timer and magnitude control supplies the pulses.

When the electrode 6 is pressed against the workpiece 7, the rough surface of the face 6a on the burn-off electrode 6 initially engages the contaminated face at punctiform contact points. The current surge effected by the condenser discharge is of short duration. This short current surge causes an explosion-like or explosive evaporation of the current paths at these individual points of contact. This simultaneously scatters the surface layers in the area where the burn-off electrode presses against the surface. The relatively high contact pressure of the electrode 6 on the surface 8 may also develop new contact points, bridges, or current paths during the evaporation of the first current paths. When this happens in the course of the short current surge it produces evaporation of these new contact bridges. The latter is also analogous to a wire explosion and effectively cleans the surface.

The gun 1 of FIGS. 1, 2, and 3, without the electrode 6 may be a commercially available capacitor stud welding gun.

After the welding gun is removed a clean area remains on the workpiece 7. The size of the area corresponds to the cross section of the burn-off electrode 6. The subsequent welding operaiton is accomplished by removing the burn-off electrode 6 from the welding element holder 2 and replacing it with a welding element.

FIGS. 4, 5 and 6 illustrate another embodiment of the welding gun 1 in accordance with the invention. The gun 1 corresponds substantially to the gun in FIGS. 1 to 3. It includes the welding element holder 2 which is mounted parallel to the gun axis. However, here another holder 11 is inclined 15° relative to the axis of the welding element holder 2. In FIGS. 4, 5, and 6 the inclined holder 11 receives and grips a burn-off electrode 6. The holder 11 is movable along its axis. A spring located in the interior of the gun 1 biases the holder 11, and the burn-off electrode 6 which it secures, in the outward longitudinal direction.

As shown in FIG. 6, a fourth leg 12 extending parallel to the inclined holder 11 projects outwardly from the front of the gun. This is in addition to the previously mentioned legs 3, 4 and 5. The leg 12 serves to guide positioning of the burn-off electrode 6 during the cleaning operation in a direction perpendicular to the surface 8.

In the rest position the burn-off electrode 6 extends beyond the supported leg 12 by a distance $b$. That is to say when the burn-off electrode 6 is placed so that its front face 6a contacts the surface 8 of the workpiece 7 in a position so that the electrode axis is perpendicular to the surface 8 the leg 12 is separated from the surface 8 by a distance $b$. An operator adjusts the welding gun to its proper starting position by placing it against the workpiece 7 as shown in FIG. 4. In that position the gun is somewhat inclined to the workpiece and the burn-off electrode is perpendicular to the workpiece surface 8. Then the welding gun is presses against the workpiece surface 8. The holder 11 and the burn-off electrode 6 recede into the gun against the force of the interior spring while pressing against the workpiece surface perpendicularly. The recession of the holder 11 and electrode 6 continues until three of the four supporting legs, namely 3, 4 and 12 touch the workpiece 7. The projections of the legs 3, 4 and 12 are such that when they touch the workpiece 7 the burn-off electrode 6 has its axis substantially perpendicular to the surface 8. Once the legs 3, 4 and 12 of the welding gun form a three point contact as they are placed on the workpiece and as shown in FIG. 5 the operator triggers the previously explained discharge process by pressing the trigger 9.

With the gun illustrated in FIGS. 4, 5, and 6 the burn-off electrode need not be removed from its holder 11 for a subsequent welding operation. Rather the gun is tilted so that the welding element placed in the holder 2 engages the cleaned off area previously contacted by the burn-off electrode 6.

The gun is then pressed against the workpiece 7 until the legs 3, 4 and 5 contact the workpiece. By squeezing the trigger 9 the operator then starts the discharge cycle and the welding element held by the holder 2 is welded to the cleaned off area.

According to one embodiment of the invention the burn-off electrode is composed of a metal having a high combustion resistance such as a hard metal like tungsten. Such an electrode experiences comparatively little wear due to combustion and can be used for a great number of cleaning operations.

According to another embodiment of the invention the burn-off electrode 6 is composed of materials having a high melting point such as titanium, niobium, zirconium, molybdenum, etc. Such electrodes are subject to greater wear due to combustion and experience a shorter life. Operation with burn-off electrodes of such more easily combustible materials besides causing evaporation of the surface layer of the workpiece, produces evaporation of a more than negligible portion of the burn-off electrode. The electrode metal vapors diffuse into the uppermost layer of the workpiece 7. The clean surface is thus alloyed with high quality materials. This alloying improves the quality of the subsequent welding connection.

Although not specifically shown herein the welding gun is energized by a condenser discharge pulse generator. In such a pulse generator a source is connected across a capacitor to charge the capacitor to its desired voltage level. When the trigger 9 is squeezed it closes a connection from one plate of the capacitor to either the welding element or the electrode 6, whichever is being held by the holder 2 in FIGS. 1, 2 and 3. At the same time, the other plate of the capacitor is connected by means of a clamp or otherwise to the metal workpiece 7. This connection to the metal workpiece 7 may be accomplished either through a switch controlled by the trigger 9 or directly from the other plate of the capacitor. Preferably the connection completed by the trigger 9 to the electrode 6 or welding element is through the holder 2. However, it may also be through the spring at the interior of the gun 1 which biases the holder 2 and the electrodes 6 longitudinally outward.

Thus, the trigger closes a path from one plate of the capacitor to the electrode 6, through the interface of the electrode 6 and the workpiece 7, and from the clamp or other connection of the workpiece 7 back to the other plate of the capacitor. This causes the capacitor to discharge through the low resistance represented by the electrode 6, the interface, and the workpiece 7.

In FIGS. 4, 5 and 6 the trigger 9, similarly closes a connection from one plate of the capacitor to the electrode 6, preferably through the holder 11, or the spring in the interior which projects the holder 11 longitudinally outward, or both. In the same manner as in FIGS. 1, 2 and 3, there exists in FIGS. 4, 5 and 6 a connection through a clamp or otherwise from the workpiece 7 to the other plate of the capacitor. Thus, when the electrode 6 is in contact with the surface 8 of the workpiece 7 and the trigger squeezed, a discharge current flows from one plate of the capacitor through the switch (operated by the trigger 9), the electrode 6, the interface between the electrode 6 and the workpiece 7, the workpiece 7, and to the other plate of the capacitor. This causes a current flow over a short period of time to the low resistance formed in this current path.

In FIGS. 4, 5 and 6 the welding element which is placed in the holder 2 is also connected by squeezing of the trigger 9 to the same side of the capacitor as the electrode 6 through either the holder 2 or the spring that projects the holder 2 longitudinally outward or both. Thus, if the electrode 6 contacts the workpiece 7 the discharge passes through the interface between the electrode 6 and the workpiece 7. If the welding element held in the holder 2 contacts the workpiece 7 then the discharge current from the capacitor flows through the interface between the element and the workpiece 7.

Suitable means in the pulse generator protect the source from being shorted during the discharge cycle.

The capacitor discharge stud welding gun 1 of FIGS. 1, 2 and 3, including its capacitor and charging apparatus is available as a system or alone on a commercial basis. In such systems the gun welds the stud or other elements to be welded to the metal workpiece. According to one aspect of the invention the same commercial gun utilizing the same capacitor and charging system as well as discharging system, grips a tungsten, titanium, niobium, zirconium or molybdenum electrode, and then operates with such an electrode identically as it would have with the stud. This performs the cleaning operation.

While embodiments of the invention have been described in detail it will be obvious to those skilled in the art that the invention may be embodied otherwise without departing from its spirit and scope.

What is claimed is:

1. A metal treating apparatus, comprising stud welding means for pressing an element having a given melting point against the metal surface to which the element is to be welded and for applying through the interface of the element and the metal a current pulse exceeding the magnitude and time for welding the element to the metal while maintaining the integrity of both, and an electrode having a melting point greater than the element, support means in said stud welding means for connecting said electrode in said stud welding means to have the current pass through the interface of the electrode and the metal, said support means including a first holding means for grasping said element and said second holding means for grasping said electrode, said welding means being connected at each of said holding means to apply pulses thereto, said first holding means and said second holding means holding said electrode and said element relative to each other in such positions that an operator can press one element at a time against the metal surface.

2. An apparatus as in claim 1, wherein said holding means define receiving chambers having longitudinal orientations which are angular relative to each other.

3. An apparatus as in claim 2, wherein said support means include three legs extending parallel to said receiving chamber of said first holding means and a fourth leg parallel to the direction of the chamber of said second holding means.

4. An apparatus as in claim 3, wherein said support means include spring means for pressing said electrode against said metal when the fourth leg and two of said other three legs rest on said metal.

5. An apparatus as in claim 2, wherein said support means includes three legs having ends defining a first plane, said first holding means including means for holding the element in a retracted position so that the forward tip of the element fails to reach the plane and for projecting the element so that the forward tip of the element reaches the plane said support mean including a fourth leg forming a second plane with two of said first three legs, said second plane being angularly oriented with respect to said first plane, said second holding means having means for holding said electrode in a retracted position in which the forward tip of the electrode fails to reach the second plane and for driving the electrode onto the second plane.

6. A metal treating apparatus, comprising stud welding means for pressing an element having a given melting point against the surface of a metal workpiece to which said element is to be welded and for applying through the interface of said element and said metal workpiece a current pulse exceeding the magnitude and time for welding said element to said metal while maintaining the integrity of both, an electrode having a melting point greater than said element, first and second holding means in said stud welding means for grasping and pressing said respective electrode and element against said metal workpiece one at a time thereby permitting a pulse of current to pass through the metal and the respective electrode and element, and a common circuit completing a conductive path for applying electrical pulses to said holding means.

7. A metal treating apparatus, comprising stud welding means for pressing an element having a given melting point against the surface of a metal workpiece to which said element is to be welded and for applying through the interface of said element and said metal workpiece a current pulse exceeding the magnitude and time for welding said element to said metal while maintaining the integrity of both, an electrode having a melting point greater than said element, first and second holding means in said stud welding means for grasping and pressing said respective electrode and element against said metal workpiece one at a time thereby permitting a pulse of current to pass through the metal and the respective electrode and element, and a common circuit completing a conductive path for applying electrical pulses to said holding means, said stud welding means including two legs and a third leg forming a first tripod to align said first holding means relative to the metal and to direct the element away from the metal and a fourth leg forming a second tripod to align the second holding means with the metal and direct the electrode away from the metal.

8. An apparatus as in claim 6, wherein the longitudinal axis which said first holding means holds said element is inclined at an acute angle to the longitudinal angle at which said second holding means holds said electrode.

9. An apparatus as in claim 8, further comprising first, second, third and fourth legs mounted on said stud welding means so that the ends of the first, second and third legs defining a first plane perpendicular to the axis of said first holding means and that the ends of the first, second and fourth legs defining a second plane perpendicular to the axis of said second holding means.

10. An apparatus as in claim 9, wherein said first holding means includes first spring means for pressing said element against said metal workpiece when said first, second, and third legs rest on the one surface of said metal workpiece and wherein said second holding means includes second spring means for pressing said electrode against said metal workpiece when said first, second, and third legs rest on the surface of the metal workpiece.

11. A stud welder, comprising first and second holders, said first holder mounting a burn-off cleaning electrode, said second holder mounting an element to be welded to a metal workpiece, and circuit means for applying a welding pulse to at least one of said holders at a time, said holders being electrically connected respectively with said electrode and said element, said holders holding said electrode and said element in relative positions so that an operator can press one of said element and said electrode against a workpiece at a time.

12. A stud welder, comprising first and second holders, said first holder mounting a burn-off cleaning electrode, said second holder mounting an element to be welded to a metal workpiece, and circuit means for applying a welding pulse to at least one of said holders at a time, said holders being electrically connected respectively with said electrode and said element, said holders holding said electrode and said element in relative positions so that an operator can press one of said element and said electrode against a workpiece at a time, support means for holding said holders, four legs extending from said support means, three of said legs forming a tripod for positioning said electrode so that the holder means can project the electrode against the surface of the workpiece and clean the surface while keeping the element away from the workpiece, two of said three legs and the fourth of said legs forming a tripod for positioning the element so that the element can be projected against the surface of the workpiece for welding thereto while maintaining the electrode away from the surface.

13. A stud welder as in claim 12, wherein the three of said legs form the tripod so as to position the electrode substantially normal to the surface of said workpiece, and wherein said two of said three legs and the fourth of said legs form a tripod for positioning the elements substantially normal to the surface of the workpiece.

14. An apparatus as in claim 5, wherein said first holding means includes first spring means for pressing said element against the metal workpiece when said first, second and third legs rest on the surface of a metal workpiece, and wherein said second holding means includes second spring means for pressing said electrode against a metal workpiece when said first, second and fourth legs rest on the surface of said metal workpiece.

* * * * *